July 15, 1952 C. C. BARBER 2,603,027
FISHHOOK DISGORGING DEVICE
Filed Nov. 27, 1946
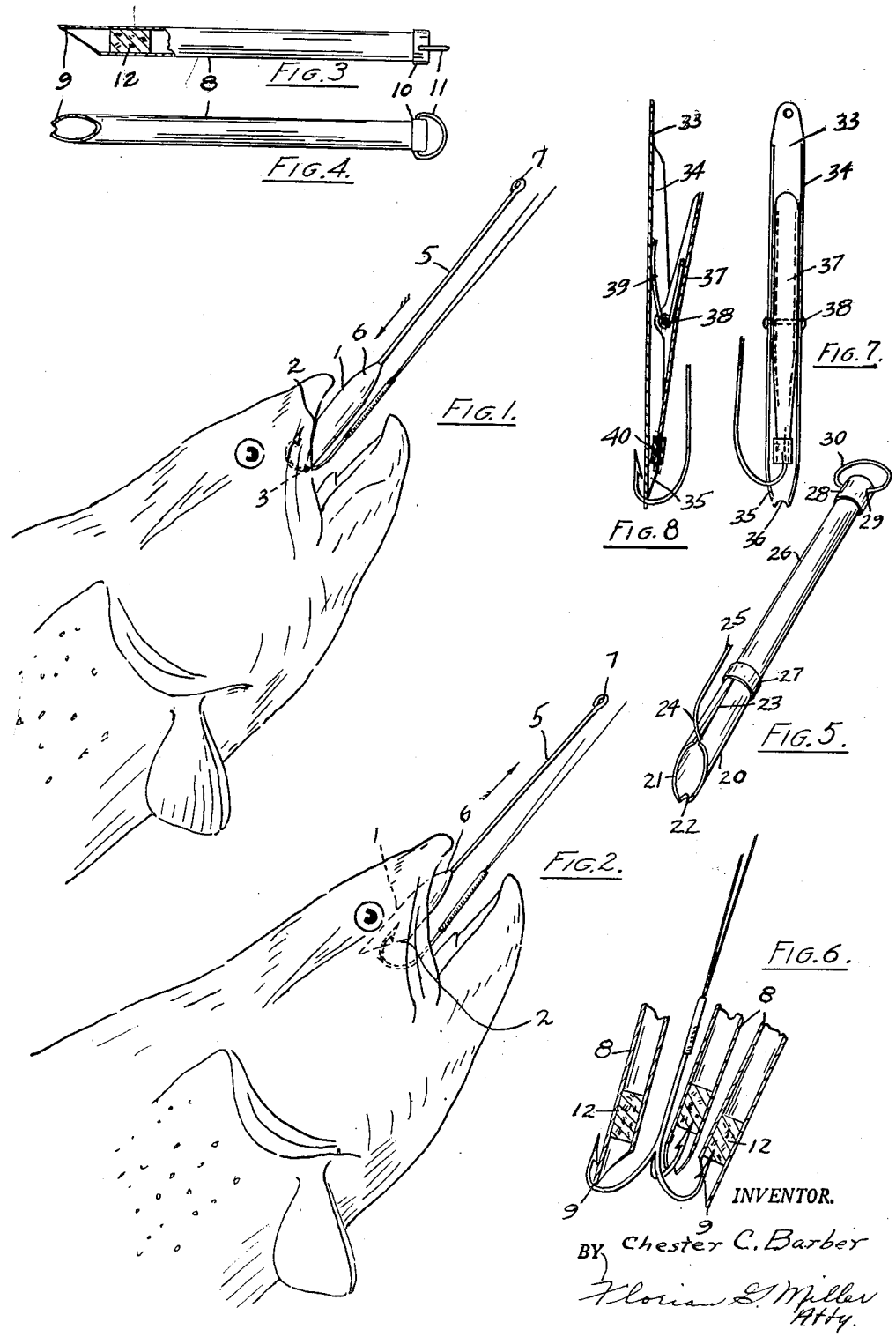
INVENTOR.
BY Chester C. Barber
Florian E. Miller
Atty.

Patented July 15, 1952

2,603,027

UNITED STATES PATENT OFFICE 2,603,027

FISHHOOK DISGORGING DEVICE

Chester C. Barber, North East, Pa.

Application November 27, 1946, Serial No. 712,603

1 Claim. (Cl. 43—53.5)

This invention relates generally to a combination disgorging and safety device for removing a fish hook from the body of a fish.

Disgorging devices for fish hooks lodged in the body of a fish have been provided but no means has heretofore been provided to safely lodge the barb of a fish hook in a safety device so that it may be withdrawn from the mouth of a fish after it is disgorged. Previously disgorging devices have enable fishermen to dislodge the fish hook from some particular part of the body of the fish but the barb of the hook would get caught in most instances in another part of the body of the fish upon being withdrawn from the fish. In these prior devices, it has been practically impossible to withdraw a fish hook from the body of a fish without destroying the life of the fish. Pliers and other means are at present utilized for removing a fish hook from the mouth of a fish but the fish are so damaged that they soon die and if they are to small and are therefore thrown back, the fish dies. The greatest trouble which arises in removing fish hooks from the mouth and body of a fish is when a gang hook is used and it is necessary to remove several hooks from the mouth and body of the fish at the same time. Fish hooks are now frequently broken utilizing pliers, present disgorgers, or one's fingers. Many fishermen have been injured in using prior disgorging devices or their fingers in removing fish hooks from the body of a fish.

It is, accordingly, an object of my invention to provide a combination disgorging and safety device for removing a fish hook from the body of a fish and it is more particularly an object of my invention to provide a combination disgorging and safety device for removing a fish hook from the body of a fish which is simple in construction, economical in cost, efficient in operation, and economical in manufacture.

Another object of my invention is to provide a combination disgorging and safety device for removing one or more fish hooks from the body of a fish which has means for covering the barb of the hook while it is being withdrawn from the mouth of a fish.

Another object of my invention is to provide a combination disgorging and safety device for removing fish hooks from the body of a fish which does not kill the fish upon removal of the hooks.

Another object of my invention is to provide a combination disgorging and safety device for removing fish hooks from the body of a fish having means for lodging the barb of the hook within the body of my novel device.

Another object of my invention is to provide a combination disgorging and safety device for removing fish hooks from the body of a fish which is particularly adaptable for use with gang hooks.

Another object of my invention is to provide a device for removing fish hooks from the body of a fish without injury to the fisherman.

Other objects of my invention will become evident from the following detailed description, taken in conjunction with the accompanying drawings, in which Fig. 1 is an illustrative view showing an illustration of one embodiment of my novel invention in the process of disgorging a fish hook from the top of the mouth of a fish;

Fig. 2 is an illustrative view as shwn in Fig. 1 with my novel device shown in a position for the removal of the fish hook from the mouth of a fish with the barb of the hook disposed in a safety position in my novel device;

Fig. 3 is a side elevational view with parts broken away of one embodiment of my invention;

Fig. 4 is a side elevational view of the embodiment of my invention shown in Fig. 3 in another plane;

Fig. 5 is a perspective view of a modification of my novel invention;

Fig. 6 is a fragmentary sectional view of three of my novel devices utilized in removing a gang hook;

Fig. 7 is a side elevational view of another modified form of my invention; and

Fig. 8 is a vertical sectional view of the modified form of my invention shown in Fig. 7.

Referring now to the drawings, Figs. 1 and 2 show a tubular member 1 cut away at 2 at approximately a 45 degree angle and having a furcated end 3 adapted to engage the shank of a fish hook as shown in Fig. 1 to disgorge the hook from the body of a fish. A handle 5 is secured to the tapered end 6 of the tubular member 1 and has an eye 7 so that at least three of these novel devices may be carried on a chain for use in removing a gang hook, although it will be evident that this device may be used singularly or any number of them may be used to remove a plurality of hooks or a gang hook. The tubular member 1 may be a straight tubular member 8 with furcated end 9 as shown in Figs. 3 and 4 instead of the handle 5 secured to the tapered end 6 without departing from my invention. When a straight tubular member 8 as shown in Figs. 3 and 4 is used, any form of fastening device such as the cap 10 and ring 11 shown may be provided on the end of the tubular member 8 to connect several of the tubular members 8 together by means of a chain or any other fastening device. A cork 12 or any other suitable material is disposed in the tubular members 1 and 8 for receiving the barbed end of a fish hook as shown in Fig. 2 so that the fish hook may be removed from the mouth or body of a fish in a safe position and without killing the fish if it has to be thrown back because it is too small.

In operation, the furcated end 3 or 9 of the tubular member 1 or 8 is placed against the shank of a fish hook and the tubular member 1 or 8 is pushed in the direction of the arrow as shown in Fig. 1 to dislodge the barb 1 of the fish hook from the body of a fish. The tubular member 1 or 8 is then rotated and the barb of the fish hook is then lodged in the cork 12 in the tubular member 8 as shown in Fig. 6. The hook can then safely be withdrawn from the fish's mouth without tearing the mouth or body of the fish and without having the barb of the hook continually engage the mouth or body of the fish as it is withdrawn. It will be evident that three or more of my novel combination disgorging and safety devices may be used for a gang hook as shown in Fig. 6 when several hooks are in the mouth or body of a fish at the same time. Each hook is placed in a safety position as shown in Fig. 6 and all of them are removed from the mouth of the fish at one time.

Fig. 5 is a modified form of my invention in which tubular member 20 is cut-away at approximately a 45 degree angle to the longitudinal axis of the member as at 21 and has the outer tapered end 22 thereof furcated to engage the shank of a fish hook to disgorge the barb thereof from the body of a fish. The tubular member 20 has a generally V-shaped slot 23 extending longitudinally thereof with the widest portion thereof at the inner tapered end of the cut away portion for frictionally engaging the shank 24 of a fish hook 25 to place and secure the barb thereon inside of the tubular member 20 in a safety position when it is desired to remove the hook 25 from the body of a fish. In this novel modification, a handle 26 in cylindrical form made of wood, plastic, or the like is provided and is engaged with the ring 27 on the end of tubular member 20 by a pressure fit or any other suitable fastening means may be utilized. The outer end of the tubular handle 26 has a cap member 28 with an aperture 29 therethrough for receiving a ring 30. In this novel embodiment of my device, the hook 25, after being removed from the body of the fish by engagement of the furcated end 22 of tubular member 20, is disposed in the slot 23 of the tubular member 20 as shown in Fig. 5 with the barb inside of the tubular member 20. Cork or any other suitable material (not shown) may also be provided in the tubular member 20 to lodge the barb of the fish hook 25 therein. However, it has been found that frictional engagement between the sides of the slotted portion 23 of the tubular member 20 and the shank 24 of the fish hook 25 holds the fish hook safely in a position as shown in Fig. 5 so that it may be readily and safely removed from the body of the fish.

Figs. 7 and 8 show a modified form of my novel invention comprising a member 33 having sides 34 with the ends 35 thereof cut-away at approximately an acute angle and with the outer portion 36 thereof in furcated form to disgorge a fish hook from the body of a fish. A latch member 37 is pivotally mounted at 38 on member 33 and has a spring member 39 for constantly urging the outer rubber covered end 40 of the latch member 37 into engagement with the member 33. In this embodiment of my device, the barb of a fish hook is engaged and covered by the end 40 of the latch member 37 to place the barb in a safety position after the hook is disgorged from the body of a fish. Any form of suitable latch means may be provided to engage the barb of a fishhook and place it in a safety position without departing from the spirit of my invention. This embodiment of my device operates approximately the same as the operation heretofore disclosed for my novel devices shown in Figs. 1 to 4, inclusive.

It will be evident from the foregoing description that I have provided a novel combination disgorging and safety device for removing fish hooks from the body of a fish which permits a hook or a plurality of hooks to be safely removed from the body of a fish without tearing away parts of the body of a fish and killing it so that if the fish is too small, it may be thrown back into the water and continue to grow.

Various changes may be made in the specific embodiment of my invention without departing from the spirit thereof or from the scope of the appended claim.

What I claim is:

A combination disgorging and safety device for digorging a fishhook from the body of a fish and securing the fishhook with the barb thereof sheathed within the disgorging and safety device without removing the device comprising a tubular member having one end thereof tapered on a line approximately forty-five degrees to the axis of said tubular member and having the outer tapered end thereof bifurcated, said tubular member having an elongated converging tapered slot extending longitudinally of said tubular member with the widest end thereof at the inner terminal end of said tapered portion, the major portion of said slot having less width than the diameter of the shank of a conventional fishhook whereby the shank of the fishhook is frictionally engaged and secured in said tapered slot upon longitudinal movement of the hook therein with the barb of the hook sheathed safely and completely within said tubular member.

CHESTER C. BARBER.

REFERENCES CITED

The following references are of record in the file of this patent:

UNITED STATES PATENTS

| Number | Name | Date |
| --- | --- | --- |
| 337,593 | Levison | Mar. 9, 1886 |
| 430,827 | Brewer | June 24, 1890 |
| 639,030 | Haak | Dec. 12, 1899 |
| 1,629,583 | Nelson | May 24, 1927 |
| 1,728,864 | Kramer | Sept. 17, 1929 |
| 1,751,762 | Schoenberger | Mar. 25, 1930 |
| 1,791,518 | Woodring | Feb. 10, 1931 |
| 2,144,300 | Stryker | Jan. 17, 1939 |
| 2,164,907 | Falkner | July 4, 1939 |
| 2,225,309 | Lawrence | Dec. 17, 1940 |